United States Patent
Rozman et al.

(10) Patent No.: US 10,644,513 B2
(45) Date of Patent: May 5, 2020

(54) HIGH VOLTAGE POWER GENERATING SYSTEM

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 585 days.

(21) Appl. No.: 15/176,257

(22) Filed: Jun. 8, 2016

(65) Prior Publication Data

US 2017/0358930 A1 Dec. 14, 2017

(51) Int. Cl.
| | |
|---|---|
| *H02J 5/00* | (2016.01) |
| *H02P 9/02* | (2006.01) |
| *H02J 7/00* | (2006.01) |
| *H02J 7/14* | (2006.01) |
| *H02P 9/34* | (2006.01) |
| *H02K 19/36* | (2006.01) |
| *H02P 9/32* | (2006.01) |

(52) U.S. Cl.
CPC .............. *H02J 5/00* (2013.01); *H02J 7/0018* (2013.01); *H02J 7/1423* (2013.01); *H02P 9/02* (2013.01); *B60L 2220/18* (2013.01); *B60L 2220/54* (2013.01); *H02J 7/143* (2020.01); *H02K 19/36* (2013.01); *H02P 9/32* (2013.01); *H02P 9/34* (2013.01)

(58) Field of Classification Search
CPC .. H02J 7/0018; H02J 7/143; H02J 9/02; H02J 7/1423

USPC ........................................................... 307/63
See application file for complete search history.

(56) References Cited

U.S. PATENT DOCUMENTS

| | | | | |
|---|---|---|---|---|
| 4,275,344 A | * | 6/1981 | Mori ...................... | H02J 7/245 320/123 |
| 4,348,628 A | * | 9/1982 | Loucks ................. | H02J 7/1423 180/65.1 |
| 4,475,075 A | | 10/1984 | Munn | |

(Continued)

FOREIGN PATENT DOCUMENTS

EP    1065106    1/2001

OTHER PUBLICATIONS

The Extended European Search Report for EP Application No. 17173700.0, dated Oct. 12, 2017.

*Primary Examiner* — Michael R. Fin
(74) *Attorney, Agent, or Firm* — Carlson, Gaskey & Olds, P.C.

(57) ABSTRACT

A power system architecture includes a prime mover, a plurality of single phase permanent magnet generators mechanically coupled to the prime mover, a DC power bus including a plurality of DC power storage components, each of the DC energy storage components being electrically connected to at least one of the single phase permanent magnet generators, a plurality of state of charge calculators, each of the state of charge calculators being connected to one of the DC energy storage component and being communicatively coupled to a generator control unit, and wherein the generator control unit is configured to independently control each of the single phase permanent magnet generators.

17 Claims, 3 Drawing Sheets

(56) References Cited

U.S. PATENT DOCUMENTS

| | | | | |
|---|---|---|---|---|
| 4,539,515 A | * | 9/1985 | Morishita | H02J 7/1423 307/16 |
| 4,604,565 A | | 8/1986 | Yokota et al. | |
| 4,684,814 A | * | 8/1987 | Radomski | F02N 11/04 290/31 |
| 4,816,736 A | * | 3/1989 | Dougherty | H02J 7/1423 320/116 |
| 5,625,276 A | * | 4/1997 | Scott | B23K 9/1062 322/24 |
| 5,969,624 A | * | 10/1999 | Sakai | B60K 6/46 340/636.1 |
| 6,037,740 A | * | 3/2000 | Pollock | B60L 11/1801 318/701 |
| 6,181,111 B1 | | 1/2001 | Hoffman et al. | |
| 6,275,012 B1 | * | 8/2001 | Jabaji | H02K 19/34 322/22 |
| 6,392,348 B1 | * | 5/2002 | Dougherty | H02J 7/1423 315/82 |
| 7,405,496 B2 | * | 7/2008 | Wagoner | H02J 3/005 307/82 |
| 7,948,218 B2 | | 5/2011 | Regazzi et al. | |
| 8,085,003 B2 | | 12/2011 | Gieras et al. | |
| 8,237,416 B2 | | 8/2012 | Rozman et al. | |
| 8,373,325 B2 | | 2/2013 | Ichiyama | |
| 8,432,137 B2 | | 4/2013 | Rozman et al. | |
| 8,587,160 B2 | * | 11/2013 | Dai | H02M 5/4505 307/151 |
| 8,798,832 B2 | | 8/2014 | Kawahara et al. | |
| 9,941,827 B2 | * | 4/2018 | Rozman | H02K 11/049 |
| 2004/0113507 A1 | * | 6/2004 | Yoda | H02K 11/048 310/179 |
| 2004/0189248 A1 | * | 9/2004 | Boskovitch | B60L 11/1851 320/116 |
| 2006/0283350 A1 | * | 12/2006 | Kumar | B60L 58/10 105/26.05 |
| 2008/0116759 A1 | | 5/2008 | Lin | |
| 2009/0309551 A1 | * | 12/2009 | Lazarovich | H02J 7/0073 320/138 |
| 2010/0065351 A1 | | 3/2010 | Ichikawa | |
| 2012/0098261 A1 | * | 4/2012 | Rozman | F02N 11/006 290/31 |
| 2013/0134920 A1 | * | 5/2013 | Ishikawa | H02P 25/0925 318/701 |
| 2014/0139062 A1 | * | 5/2014 | Rozman | H02K 39/00 310/112 |
| 2014/0265693 A1 | * | 9/2014 | Gieras | H02P 9/00 310/112 |
| 2014/0266079 A1 | * | 9/2014 | Rozman | H02P 9/02 322/28 |
| 2015/0314694 A1 | | 11/2015 | Alakula et al. | |
| 2016/0006276 A1 | * | 1/2016 | Mikulec | H02J 1/16 307/19 |
| 2016/0065134 A1 | * | 3/2016 | Lu | H03F 1/523 330/251 |
| 2017/0302079 A1 | * | 10/2017 | Wyma | H02J 3/26 |

* cited by examiner

HIGH VOLTAGE POWER GENERATING SYSTEM

TECHNICAL FIELD

The present disclosure relates generally to high voltage power generating systems, and more specifically to a high voltage power generating system including multiple single phase permanent magnet generators.

BACKGROUND

Certain ground vehicles, such as those utilized in military and similar applications use hybrid electric technology including high voltage DC power generating. Due to their high inherent power density, synchronous permanent magnet generators are frequently utilized in this type of application when weight and/or size are important parameters.

A typical electrical power system architecture for such an application includes an unregulated permanent magnet generator coupled to a boost pulse width modulated power converter that acts as an active rectifier. Also included in the typical electrical power system is a high voltage battery or other high energy storage device. In some applications, the near constant power load over the duration of the operating time is coupled with high peak loads. To support the peak power requirements, re-chargeable high energy storage batteries are utilized.

When the high energy storage batteries become drained during peak load operations, a monitoring system detects the low energy. Then, during standard operations at a base load, a generator control unit routes at least a portion of the power from the unregulated permanent magnet generator to the DC bus including the high energy storage batteries, and all the high energy storage batteries are simultaneously re-charged.

SUMMARY OF THE INVENTION

In one exemplary embodiment a power system architecture includes a prime mover, a plurality of single phase permanent magnet generators mechanically coupled to the prime mover, a DC power bus including a plurality of DC power storage components, each of the DC energy storage components being electrically connected to at least one of the single phase permanent magnet generators, a plurality of state of charge calculators, each of the state of charge calculators being connected to one of the DC energy storage component and being communicatively coupled to a generator control unit, and wherein the generator control unit is configured to independently control each of the single phase permanent magnet generators.

In another exemplary embodiment of the above described power system architecture a number of DC energy storage components in the plurality of DC power storage components and a number of single phase permanent magnet generators in the plurality of single phase permanent generators is the same.

In another exemplary embodiment of any of the above described power system architectures each of the DC energy storage components is electrically coupled to exactly one of the single phase permanent magnet generators.

Another exemplary embodiment of any of the above described power system architectures further includes a DC-DC converter electrically coupled to the plurality of state of charge calculators.

In another exemplary embodiment of any of the above described power system architectures the DC-DC converter is electrically coupled to the generator control unit.

In another exemplary embodiment of any of the above described power system architectures each of the single phase permanent magnet generators includes a control winding configured to at least partially control an output voltage of the single phase permanent magnet generator.

In another exemplary embodiment of any of the above described power system architectures where each of the control windings is connected to the generator control unit via at least on asymmetric H-bridge, and wherein the asymmetric H-bridge is configured to control a current through the corresponding control winding.

In another exemplary embodiment of any of the above described power system architectures a current magnitude command from the generator control unit is connected to the asymmetric H-bridge via a current regulator, and wherein the current regulator is configured to convert the current magnitude command to switch operations of the asymmetric H-bridge.

In another exemplary embodiment of any of the above described power system architectures the generator control unit includes a memory storing instructions operable to cause the generator control unit to detect an imbalance among the plurality of DC power storage components, and to cause the generator to alter a control current in at least one control winding in response to the detected imbalance.

In another exemplary embodiment of any of the above described power system architectures at least one of the plurality of DC energy storage components is a lithium ion battery.

In another exemplary embodiment of any of the above described power system architectures each single phase permanent magnet generator in the plurality of single phase permanent magnet generators includes a in single phase rectifier, and an output of each single phase rectifier is interconnected with the DC power bus.

An exemplary method for re-balancing power storage devices within a high voltage DC power generating system includes identifying at least one high energy storage device in a plurality of high energy storage device as having a reduced charge relative to a remained of high energy storage devices, and increasing a control current to a single phase permanent magnet generator corresponding to the identified at least one high energy storage device.

In another example of the above described exemplary method for re-balancing power storage devices within a high voltage DC power generating system identifying the at least one high energy storage device includes analyzing data received from a plurality of state of charge modules using a generator controller, wherein each state of charge module corresponds to a unique high energy storage device.

In another example of any of the above described exemplary methods for re-balancing power storage devices within a high voltage DC power generating system analyzing the data comprises comparing a detected state of charge of each high energy storage device.

In another example of any of the above described exemplary methods for re-balancing power storage devices within a high voltage DC power generating system analyzing the data comprises determining a state of charge of each high energy storage device, based on raw sensor data determined by a corresponding state of charge module.

In another example of any of the above described exemplary methods for re-balancing power storage devices within a high voltage DC power generating system the raw sensor data is at least one of a current through the high energy storage device, a voltage across the high energy storage device, and a temperature of the high energy storage device.

Another example of any of the above described exemplary methods for re-balancing power storage devices within a high voltage DC power generating system further includes providing operational power to a generator control unit and to each of a plurality of state of charge modules from a single DC-DC converter.

Another example of any of the above described exemplary methods for re-balancing power storage devices within a high voltage DC power generating system further includes providing a power output directly from a single phase permanent magnet generator to the corresponding high energy storage device.

These and other features of the present invention can be best understood from the following specification and drawings, the following of which is a brief description.

DETAILED DESCRIPTION OF AN EMBODIMENT

Figure 1:
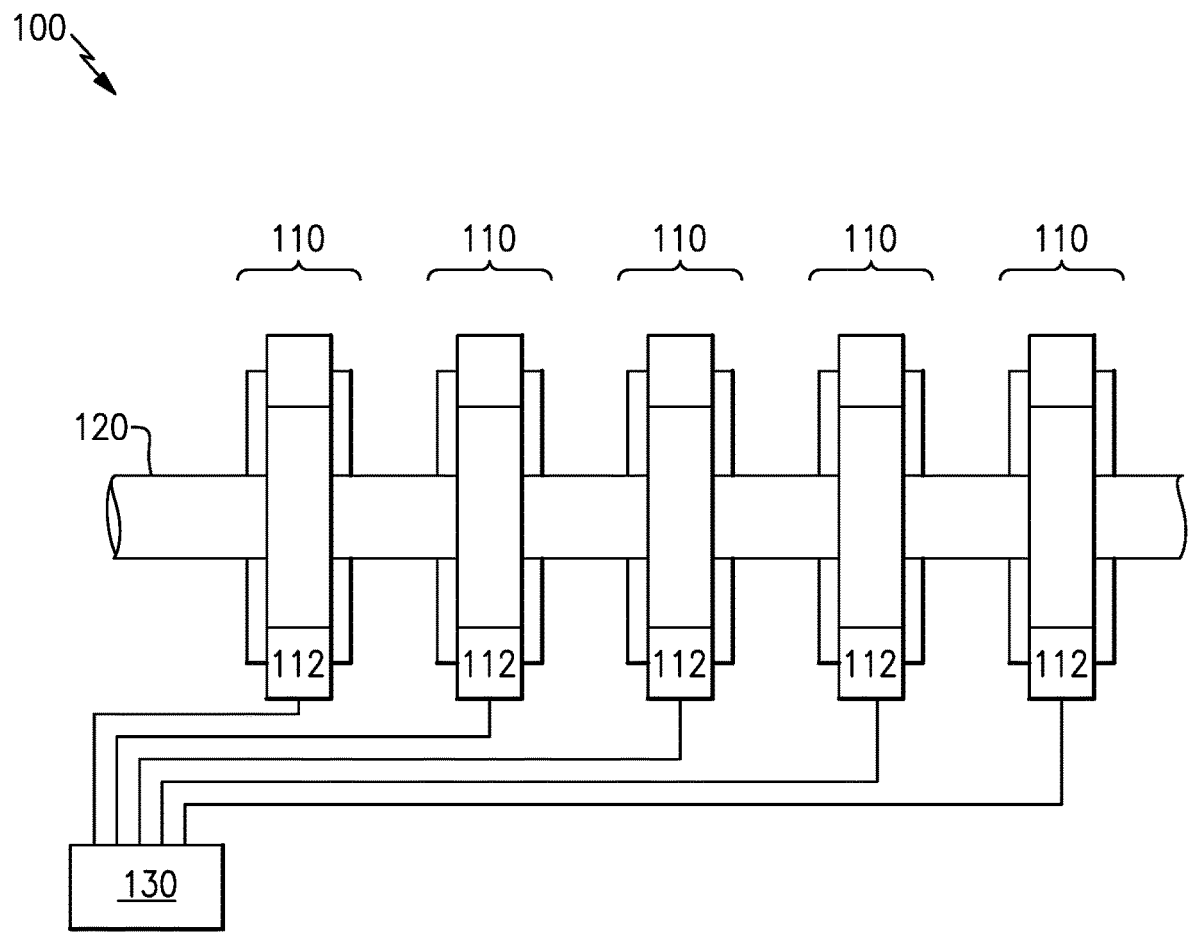
FIG. 1 schematically illustrates a permanent magnet generator configuration including multiple single phase permanent magnet generators.

FIG. 1 schematically illustrates a permanent magnet generator configuration 100, such as could be utilized in an automotive vehicle, including multiple single phase permanent magnet generators 110. Each of the permanent magnet generators 110 is connected to a single rotating shaft 120. Rotation of the shaft 120 is converted to electrical energy within each of the single phase permanent magnet generators 110 according to known permanent magnet generator techniques.

A single generator controller 130 is controllably coupled to control windings 112 located within each of the single phase permanent magnet generators 110. The control windings 112, and the generator control unit 130, operate in conjunction to control the voltage output from each single phase permanent magnet generator 110 independently of the other single phase permanent magnet generators 110. One of skill in the art having the benefit of this disclosure will understand that the specific control currents required to achieve specific voltage output controls can be readily determined according to conventional techniques.

Figure 2:
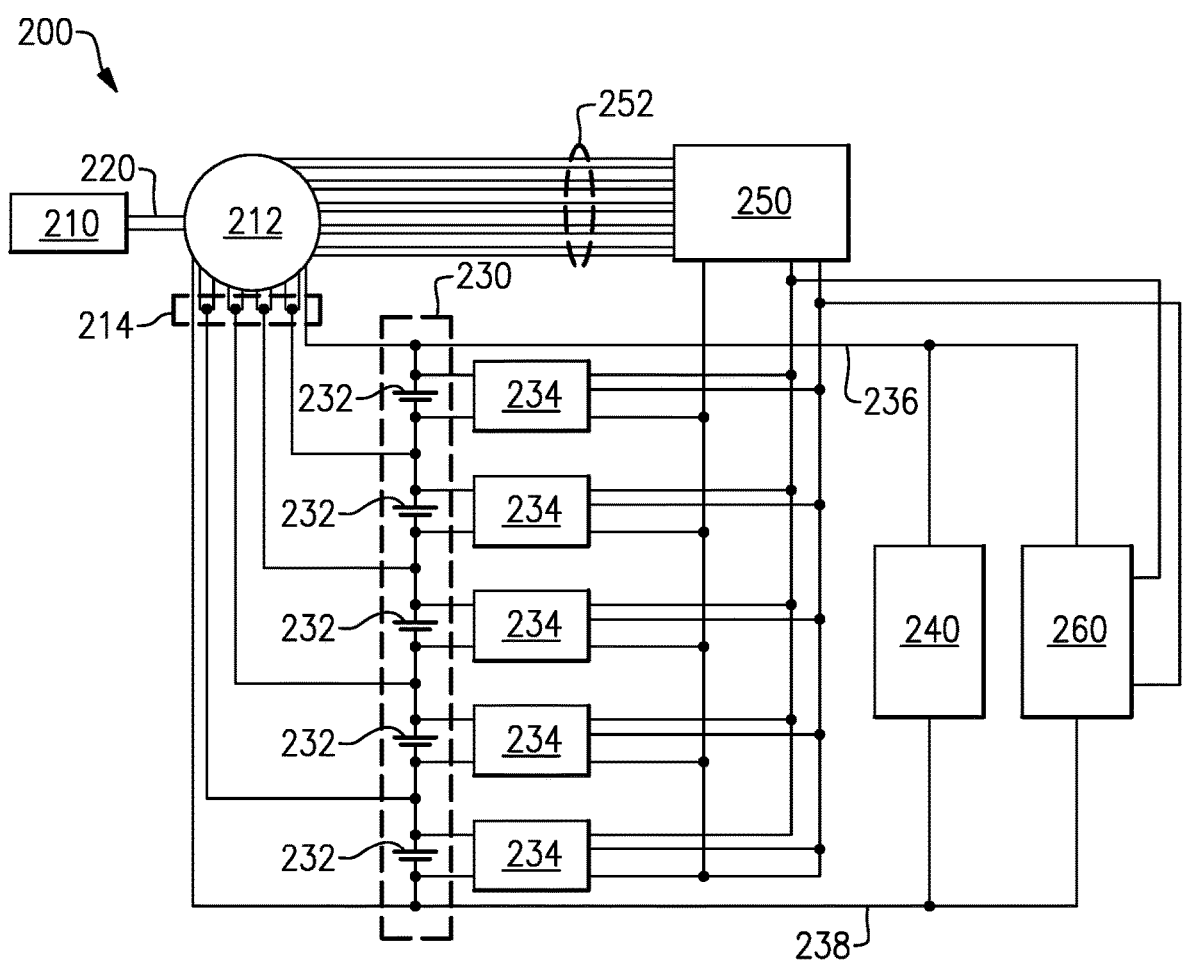
FIG. 2 schematically illustrates an electrical power generating system.
Figure 3:
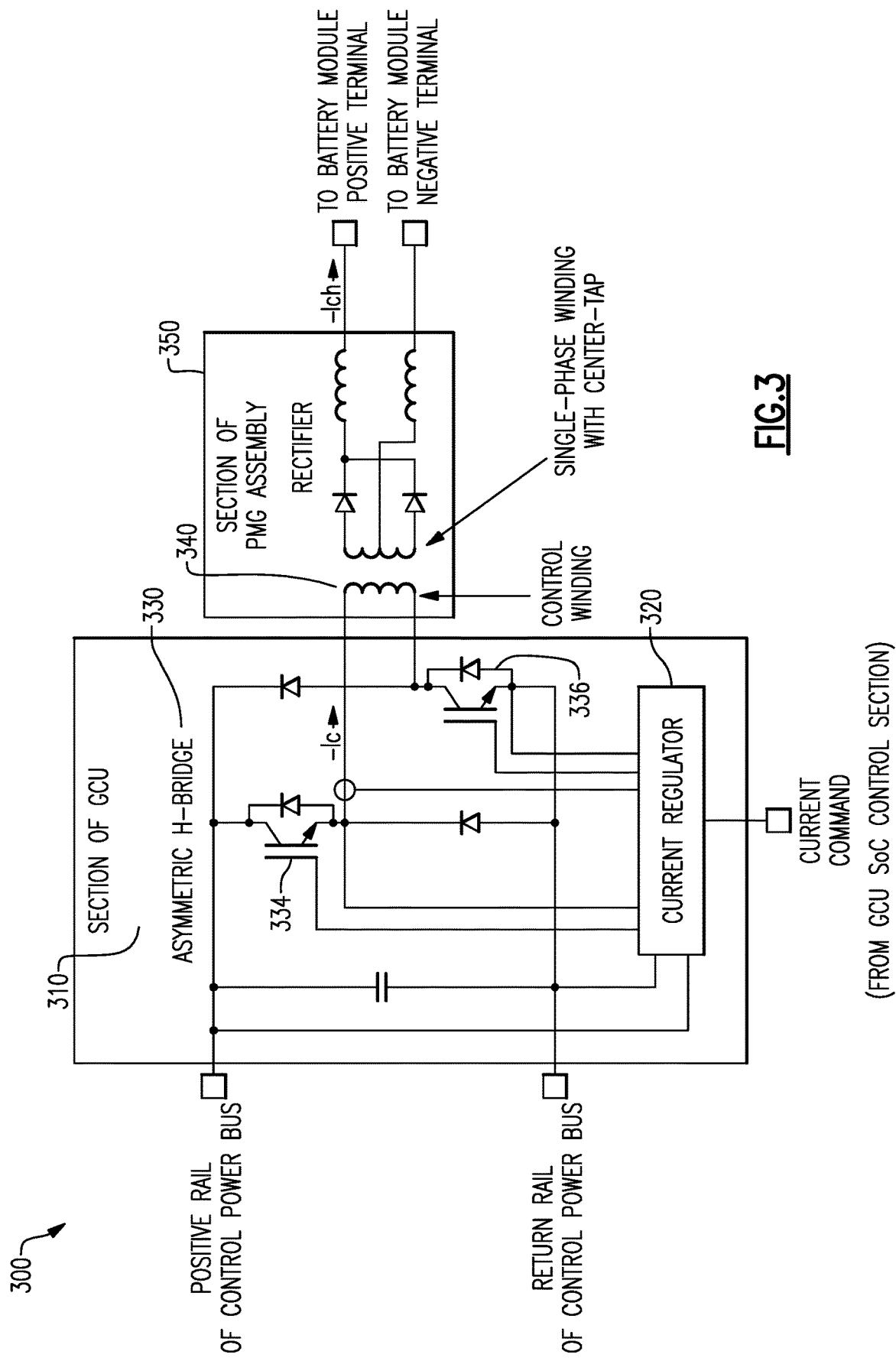
FIG. 3 schematically illustrates an exemplary circuit portion of the electrical power generating of FIG. 2.

With continued reference to FIG. 1, and with like numerals indicating like elements, FIG. 2 schematically illustrates an electrical power generating system 200. A prime mover 210 is connected to a permanent magnet generator assembly 212 via a shaft 220. The permanent magnet generator assembly 212 includes multiple single phase permanent magnet generators, each configured to generate power from the rotational input of the prime mover 210. Further, each single phase permanent magnet generator includes a built-in single phase rectifier in the generator housing, as shown in FIG. 3, to produce a DC output. The DC outputs of each of the single phase generators within the permanent magnet generator assembly 212 are interconnected in the block 214 for connections to the DC power bus 230.

Connected to an electrical output 214 of each of the permanent magnet generators is a DC power bus 230. The DC power bus 230 includes multiple high energy storage devices 232 arranged in a series configuration. By way of example, the high energy storage devices 232 can be batteries, such as lithium-ion batteries, super capacitors, or any similar type of high energy storage device. The DC bus 230 includes a positive terminal 236 and a negative (or return) terminal 238. A high voltage load 240 is connected to the DC power bus 230.

Connected to each high energy storage device 232 is a corresponding state of charge module 234. Each state of charge module 234 includes conventional sensors, such as current, voltage, and temperature sensors. The state of charge modules 234 are configured to determine the current state of charge of a corresponding high energy storage device 232 that the state of charge module 234 is connected to. Each of the state of charge modules 234 is further connected to a generator control unit 250, and outputs the current state of charge of the corresponding high energy storage device 232 to the generator control unit 250. In alternative examples, the raw sensor data is communicated to the generator control unit 250, and the generator control unit 250 determines a current state of charge.

The generator control unit 250 includes control connections 252 to each of the control windings in the permanent magnet generator assembly 212. The control connections 252 allow the generator control unit 250 to independently provide a control current to each of the permanent magnet generators within the permanent magnet generator assembly 212. This connection is illustrated in more detail in FIG. 3, and described below.

A single DC-DC converter 260 is connected to, and receives power from, the DC bus 230. The DC-DC converter 260 includes a power output that is connected to the generator control unit 250 and to each of the state of charge modules 234. The DC-DC converter 260 conditions power received from the DC power bus 230, and reduces the output voltage to a level suitable to provide operational power to the generator control unit 250 and to each of the state of charge modules 234.

During some operations, or due to various known conditions, it is possible for one or more of the high energy storage devices 232 to obtain a larger or smaller amount of charge than the remainder of the high energy storage devices 232. This is referred to as a charge imbalance. In typical power generating systems, the DC power bus 230 receives all power at a single input, and the high energy storage devices 232 are charged simultaneously. As a result, it is not possible to adjust the relative power levels of the high energy storage devices 232 without further incorporating multiple dedicated DC-DC converters corresponding to each of the high energy storage devices.

By monitoring the state of charge of each high energy storage device 234, the generator control unit 250 can determine when an imbalance exists, and alter the output voltage of only the single phase permanent magnet generator within the permanent magnet generator assembly 212 that corresponds to the high energy storage device 232 that is out of balance. By increasing the control current provided to the control winding of the corresponding permanent magnet generator, the generator control unit 250 increases the voltage provided to a high energy storage device 232 that has less stored energy than the remainder. Similarly, by decreasing the control current provided to the corresponding permanent magnet generator relative to the other control currents, the generator control unit 250 can increase the energy stored in the out of balance high energy storage device, relative to the other high energy storage devices 232. This dedicated increase or decrease enables the generator control unit 250 to cause one or more of the high energy storage devices 232 to be independently charged or discharged without requiring dedicated DC-DC converters, thereby allowing for rebalancing the high energy storage devices 232.

With continued reference to FIG. 2, FIG. 3 schematically illustrates an exemplary circuit portion 300 of the electrical power generating of FIG. 2. Within the generator control unit 250 are multiple asymmetric H-bridges 310, each of which is connected to the positive terminal of the control power bus 260 and the negative terminal of the control power bus 260. A current regulator 320 receives a commanded current value from a processor within the generator control unit 250 and converts the commanded current value into switch controls configured to operate the asymmetric H-bridge 330 according to known techniques. The asymmetric H-bridge 330 includes two switches 334, 336 that cooperate to control an output current of the asymmetric H-bridge 330. The output current is provided to a control winding 340 in a corresponding permanent magnet generator 350 as a control current. The magnitude of the current through the control winding 340 controls the output of the single phase permanent magnet generator 350.

The exemplary circuit portion 300 of FIG. 3 is replicated for each permanent magnet generator 350 within the permanent magnet generator assembly 212. The utilization of the independent asymmetric H-bridges 310 in conjunction with control windings 340 in the single phase permanent magnet generators 350 allows the generator control unit 250 to independently charge or discharge each high energy storage device as described above.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A power system architecture comprising:
 a prime mover;
 a plurality of single phase permanent magnet generators mechanically coupled to the prime mover, each of said single phase permanent magnet generators includes a control winding configured to at least partially control an output voltage of the single phase permanent magnet generator;
 a DC power bus including a plurality of DC energy storage components, each of the DC energy storage components being electrically connected to at least one of the single phase permanent magnet generators;
 a plurality of state of charge calculators, each of the state of charge calculators being connected to one of the DC energy storage component and being communicatively coupled to a generator control unit; and
 wherein said generator control unit is configured to independently control each of said single phase permanent magnet generators by independently controlling a current through each of said control windings.
2. The power system architecture of claim 1, wherein a number of DC storage components in said plurality of DC energy storage components and a number of single phase permanent magnet generators in said plurality of single phase permanent generators is the same.
3. The power system architecture of claim 2, wherein each of the DC energy storage components is electrically coupled to exactly one of the single phase permanent magnet generators.
4. The power system architecture of claim 1, further comprising a DC-DC converter electrically coupled to said plurality of state of charge calculators.
5. The power system architecture of claim 4, wherein the DC-DC converter is electrically coupled to said generator control unit.
6. The power system architecture of claim 1, where each of said control windings is connected to the generator control unit via at least one asymmetric H-bridge, and wherein said asymmetric H-bridge is configured to control a current through the corresponding control winding.
7. The power generating system architecture of claim 6, wherein a current magnitude command from said generator control unit is connected to said asymmetric H-bridge via a current regulator, and wherein said current regulator is configured to convert the current magnitude command to switch operations of the asymmetric H-bridge.
8. The power system architecture of claim 1, wherein said generator control unit includes a memory storing instructions operable to cause the generator control unit to detect an imbalance among the plurality of DC power storage components, and to cause the generator to alter a control current in at least one control winding in response to the detected imbalance.
9. The power system architecture of claim 1, wherein at least one of the plurality of DC energy storage components is a lithium ion battery.
10. The power system architecture of claim 1, wherein each single phase permanent magnet generator in said plurality of single phase permanent magnet generators includes a built-in single phase rectifier, and an output of each single phase rectifier is interconnected with the DC power bus.
11. A method for re-balancing energy storage devices within a DC power generating system comprising:
 identifying at least one energy storage device in a plurality of energy storage device as having a reduced charge relative to a remainder of energy storage devices; and
 increasing a control current to a single phase permanent magnet generator corresponding to the identified at least one energy storage device, wherein the single phase permanent magnet generator is one of a plurality of single phase permanent magnet generators, and wherein the plurality of single phase permanent magnet generators includes at least one unique single phase permanent magnet generator corresponding to each energy storage device in the plurality of energy storage devices.
12. The method of claim 11, wherein identifying the at least one energy storage device includes analyzing data received from a plurality of state of charge modules using a generator controller, wherein each state of charge module corresponds to a unique energy storage device.
13. The method of claim 12, wherein analyzing the data comprises comparing a detected state of charge of each energy storage device.
14. The method of claim 12, wherein analyzing the data comprises determining a state of charge of each energy storage device, based on raw sensor data determined by a corresponding state of charge module.

15. The method of claim 14, wherein the raw sensor data is at least one of a current through the energy storage device, a voltage across the energy storage device, and a temperature of the energy storage device.

16. The method of claim 11, further comprising providing operational power to a generator control unit and to each of a plurality of state of charge modules from a single DC-DC converter.

17. The method of claim 11, further comprising providing a power output directly from the single phase permanent magnet generator to the corresponding energy storage device.

* * * * *